United States Patent [19]
Otthofer, Jr.

[11] 3,907,622
[45] Sept. 23, 1975

[54] PROCESS FOR FORMING NEGATIVES FOR CHEMICAL ETCHING PROCESS

[75] Inventor: Jacob A. Otthofer, Jr., Lancaster, Pa.

[73] Assignee: Armstrong Cork Company, Lancaster, Pa.

[22] Filed: Aug. 16, 1974

[21] Appl. No.: 497,850

[52] U.S. Cl. .......................... 156/58; 96/36; 156/11
[51] Int. Cl.² .......................................... B44C 1/22
[58] Field of Search............ 96/27 R, 36, 36.3, 36.4, 96/40, 41; 156/11, 13, 58, 6; 117/5.1; 264/129, 162

[56] References Cited
UNITED STATES PATENTS 3,428,503   2/1969   Beckerle .............................. 156/11
3,711,346   1/1973   Landis .................................. 156/58

*Primary Examiner*—Charles E. Van Horn
*Assistant Examiner*—Jerome W. Massie

[57] ABSTRACT

A technique for the generation of film negatives which will be used in a chemical etching process to form an embossing plate. The film negatives are taken of a model which simulates the embossing plate configuration. The model is made from dark material and the surface thereof is sprayed with a light coating. The surface of the model is ground down with a series of incremental planar steps and negatives are made after each grinding step. Each grinding step removes some light coating and exposes more of the dark mold material. The contrast of the light and dark areas generates negatives which are useful for making the finished embossing plate by a chemical etching process.

4 Claims, 3 Drawing Figures

US Patent  Sept. 23,1975  3,907,622

3,907,622

PROCESS FOR FORMING NEGATIVES FOR CHEMICAL ETCHING PROCESS

BACKGROUND OF THE INVENTION

1. Field of the Invention

The invention is directed to a technique for reproducing a model surface by chemical etching onto an embossing plate and, more particularly, the invention is directed to the technique for forming the negatives which will be used in the chemical etching technique to form the embossing plate.

2. Description of the Prior Art

U.S. Pat. No. 3,428,503 discloses a rather recent technique for producing a three-dimensional effect in metal by the use of a series of photographs with chemical etching. This technique was particularly useful in the reproduction of three-dimensional objects.

U.S. Pat. No. 2,854,336 discloses one of the earliest patents directed to the use of negatives for forming an embossed effect in a plate.

U.S. Pat. No. 2,891,339 is another teaching of the use of plural negatives to form a three-dimensional effect with an object.

Recent U.S. Pat. No. 3,726,732 is directed to the use of ultraviolet light for the purpose of forming step projection and repeat projection of imagery for the purpose of forming a series of photographic negatives.

Also of interest is U.S. Pat. No. 3,711,346 which is directed to the assignee's current technique for forming a wood grain surface configuration in an embossing plate through the use of a series of negatives.

The invention herein is believed to be a very simplified manner of making a series of negatives which can be used then to form an embossing surface. The inventive technique turns around the utilization of a three-dimensional model which is sequentially modified in order to generate a series of negatives which may then be used to form an embossing plate.

SUMMARY OF THE INVENTION

The invention is primarily directed to the generating of film work which will be used to produce an embossing plate. A model is made of the configuration which will be on the embossing plate. This is made from a dark plastisol material which is then surface coated with a light color coating. This assembly is placed on a surface grinder and the grinding wheel of the surface grinder is used to remove a small amount of the high area of the model. This exposes the dark plastisol at the highest points. A negative is made of the model with the contrasting dark exposed areas and light color coated areas. The model is then placed back on the surface grinder and additional material is removed to enlarge the exposed dark area. Again, a negative is made. The sequence of removing material and making negatives is repeated until all of the light color covered areas have been removed leaving only exposed dark plastisol. The series of photographs are then used in the conventional manner with chemical etching to form the embossing plate.

DESCRIPTION OF THE PREFERRED EMBODIMENT

Figure 1:
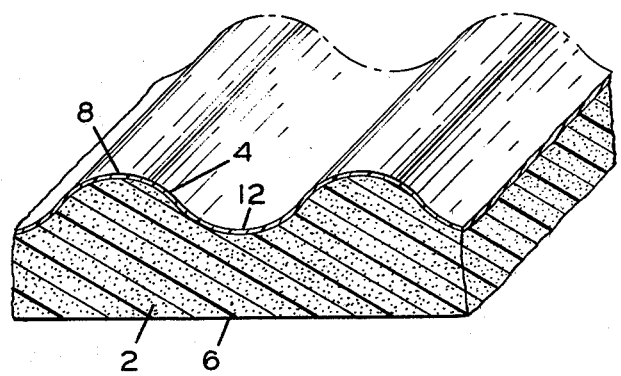
FIG. 1 is an isometric view of a model which has the configuration of the embossing plate to be formed.

Referring to FIG. 1 there is shown a coated plastisol model of the embossing surface to be formed. The first step in forming that model is to form a three-dimensional model of the embossing surface from casting or sculpturing plaster or a like material. This three-dimensional plaster model would have the configuration basically of the structure shown in FIG. 1. The upper surface of the plaster model, which is the surface to be reproduced in the embossing plate, is covered with a rubber molding material which is cast, painted or sprayed on the plaster model surface and permitted to harden to form an RTV (room temperature vulcanized) silicon rubber mold. The mold is stripped from the plaster model and a black plastisol material is cast in the RTV mold. A polyvinyl chloride plastisol could be used or almost any type of rubber or rubberlike material could be used as the material being placed in the RTV mold. The only requirements for the material being placed in the mold is that it readily conform to the configuration of the mold and that it set up to such a degree of rigidity that it may be successfully ground by a surface grinder.

Prior to the time that the black plastisol material is removed from the RTV mold, the back surface of the plastisol is ground flat in order to insure that the back of the model formed from the black plastisol will have a back which is perfectly parallel with the general plane of the pattern being formed on the front face of the black plastisol (said front face of the black plastisol being the face which is being formed by the cavity of the RTV mold).

The black plastisol is then adhered to a flat metal plate to provide it with some degree of rigidity and to enable it to be mounted to the bed of the surface grinder. The upper configured surface of the black plastisol is then sprayed with a white paint which will adhere well to the plastisol. There is thus formed basically the product of FIG. 1 wherein the black plastisol or like material is element 2 and the white or light colored coating is element 4. The back of the plastisol model is element 6 and this is what will be adjacent the bed of the surface grinder. The surface 8 of the FIG. 1 embodiment is generally that surface which must ultimately be formed on the embossing plate. It is noted that this surface configuration 8 is the mirror image of the configuration which the embossing plate must ultimately place in the product being embossed.

As is conventional in the art, registration marks are located external of the pattern area and within the view of the camera for making the photographic images so that the registration marks will appear in the series of negatives made whereby these negatives may be placed in register upon the metal surface which is to be chemically etched through use of the series of negatives. It is equally obvious that the registration marks must be located at a level which is lower than the lowest pattern area which would be basically the valley area 12 of FIG. 1.

The assembly is now placed upon a surface grinder. Basically a surface grinder is nothing more than an oversized grinding machine which has a bed which holds materials thereto by means of magnetic action. The plastisol model is held in position on the surface grinder bed. A grinding wheel is mounted above the bed of the surface grinder. Relative movement exists between the grinding wheel and the bed of the surface grinder and the grinding wheel is capable of being moved in a direction towards and away from the plane of the bed of the surface grinder.

Figure 2:
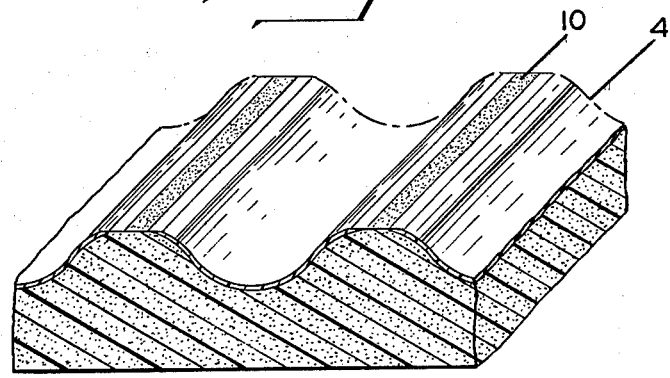
FIG. 2 is an isometric view of FIG. 1 wherein a portion of the high areas of the model have been removed exposing the underlying mold material.

The grinding wheel is lowered until it starts to penetrate the white paint on the highest areas of the plastisol model surface 8. The grinding wheel is moved in a plane across the top of the total model area and is lowered towards the bed of the surface grinder until such time as the grinding wheel penetrates the white paint on the highest areas of the model and exposes a portion 10 of the black plastisol at these highest areas of the model surface 8. This initial grinding step will give a structure which has generally the appearance of that of FIG. 2. This assembly is then taken to a camera and photographed. The camera setting is maintained in a fixed position relative to focus and distance and the plastisol model is returned to the surface grinder where the grinding wheel is lowered about 0.002 of an inch and additional material is ground off. This will result in more of the white paint coating being ground off and more of the black plastisol being exposed. The plastisol model is then taken back and photographed again. The process is repeated again and again until the grinding wheel reaches the lowest area of the surface 8. That is, the sequence of grinding off 0.002 of an inch of material and making a new negative is repeated until such time as the grinding wheel removes the white paint from the lowest area 12 of the surface configuration 8. At this point one would have primarily a black flat surface which is now parallel with the back 6 of the plastisol model. Also one would have a series of photographic negatives with the dark area 10 gradually consuming more and more of the exposed area of the film. Due to the presence of the registration marks and the manner in which the negatives were formed, the negatives will be in perfect registration and represent the surface configuration of the model at each 0.002 inch of elevation of the surface configuration 8.

Figure 3:
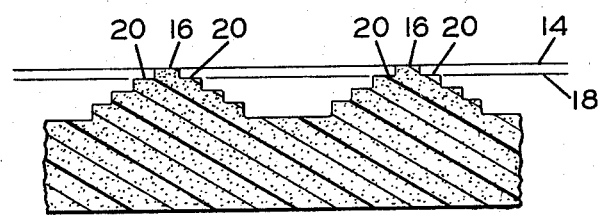
FIG. 3 is an end view of the metal embossing plate surface that has been etched to produce a configuration similar to that of FIG. 1.

By the use of conventional chemical milling techniques, the negatives are used to control the etching of a metal plate. Normally, the metal plate is painted with a photographic resist type material over which there is placed one of the negatives. The pattern of the negative is developed on the resist giving areas which are protectively covered by the resist and other areas wherein the underlying metal is exposed. This technique is disclosed in the above-mentioned prior art. Referring now to FIG. 3, the resist would be placed roughly in the plane of line 14. This would cover the flat surface of the original plate. After the negative is placed over the photographic resist and the exposure and developing are carried out in the conventional manner, there will be left only resist material over the flat areas 16 of the plate of FIG. 3. In other areas and specifically in the area between the two points 16 of FIG. 3, the resist will be readily washed off due to the fact that the resist in this area was not covered by the light areas of the negative. Since the areas between surfaces 16 are no longer protected by the photographic resist, when the plate is subjected to etching chemicals, the area between surfaces 16 will be eaten away by the chemicals with the surfaces 16 themselves being protected from attack by the etching chemicals due to the protective photographic resist coating. The etching chemicals are permitted only to eat into the metal about 0.002 of an inch. A new resist coating is placed upon the metal surface which has now basically the plane of line 18 with the two raised areas in the region of surface 16. The photographic resist will cover the planar surface in the vicinity of line 18 plus the raised areas at surface 16. The next negative in the sequence is then used and the photographic resist material is exposed and developed. There is now provided a protective coating on surfaces 16, surfaces 20 and the vertical sides connecting these two surfaces. With the application of further etching chemicals, the area between surfaces 20 is eaten away about 0.002 of an inch.

The sequence of providing a photographic resist, a negative to expose the photographic resist, and then etching is carried out in a sequential manner until all of the above formed negatives have been utilized in conjunction with the embossing plate. There is then formed a product which has a configuration, in a series of steps, which is very similar in configuration to that of the structure of surface 8 of FIG. 1. The technique of using photographic resist materials, negatives and chemical etching is well known in the art and is used in the conventional art known manner. The primary invention herein is the manner in which the series of negatives are formed for later subsequent use in the conventional chemical etching technique.

After the structure of FIG. 3 is made, it may be subjected to a "flashing" operation. That is, all resist material is removed from the metal plate and the plate has its total surface subjected to an etching solution treatment. This rounds off the sharp corners of the steps of FIG. 3 and provides a surface configuration on the metal embossing plate which surface substantially approaches the surface configuration of the model of FIG. 1.

What is claimed is:

1. A method of forming a three-dimensional surface including the steps of preparing a model of the three-dimensional surface to be duplicated with the material of the model being of a definite shade, coating the surface of the model to be reproduced with a material which is of a contrasting shade, removing from a first plane of the model surface a portion of the contrasting shade coating so as to expose a portion of the underlying model material, photographing the model surface to be reproduced in this condition of exposed areas of a definite shade which is in contrast to the coated areas, removing additional portions of the contrasting shade coating and definite shade model material from a second plane parallel to the first plane to expose more of the definite shade model material underlying the contrasting shade surface coating, photographing this surface configuration, and continuing this sequence of removing in parallel planes additional portions of the contrast shade coating and definite shade model material from the surface of the model to be reproduced and photographing that surface after each removal to secure a series of negatives which provide in effect a series of elevational cross-sectional views of the model surface to be reproduced.

2. The method of claim 1 wherein the model material is made of a dark material and is provided with an overcoating of a light material.

3. The method of claim 2 wherein the mold is sequentially ground in a series of steps to remove approximately 0.002 inches in thickness of contrasting shade coating and definite shade model material from the model surface between each photographic step.

4. The method of claim 3 wherein there is provided a flat surface of etchable material, coating said flat surface with a photo sensitive resist and using one of the above-mentioned negatives for conditioning the photo sensitive resist to coat certain areas of the etchable material and to be removable from other areas of the etchable material, removing the removable resist coating material and placing the etchable material in an etching solution to remove a portion of the etchable material not protected by the photo sensitive resist, and repeating the above steps of applying the photo sensitive resist and different above-developed photographic negatives to generate a surface configuration in the etchable material which substantially duplicates the surface configuration of the above-mentioned model.

* * * * *